United States Patent [19]
Krekeler

[11] 3,767,266
[45] Oct. 23, 1973

[54] RESILIENT RETAINING MEANS FOR CONNECTING WORK TOOLS AND WORK TOOL HOLDERS

[75] Inventor: Claude B. Krekeler, Cincinnati, Ohio

[73] Assignee: The Cincinnati Mine Machinery Co., Cincinnati, Ohio

[22] Filed: Aug. 10, 1970

[21] Appl. No.: 62,312

[52] U.S. Cl..................... 299/92, 37/142 A, 299/86
[51] Int. Cl.............................................. E21c 25/46
[58] Field of Search.............................. 299/86, 92; 37/142 A; 85/8.8; 166/241; 279/19.7

[56] References Cited
UNITED STATES PATENTS

| | | | |
|---|---|---|---|
| 3,312,285 | 4/1967 | Solum.................................. | 166/241 |
| 2,944,608 | 7/1960 | Rush................................... | 166/241 |
| 3,519,309 | 7/1970 | Engle et al........................... | 299/86 |
| 3,397,012 | 8/1968 | Krekeler.............................. | 299/92 |

FOREIGN PATENTS OR APPLICATIONS

| | | | |
|---|---|---|---|
| 1,036,535 | 7/1966 | Great Britain........................ | 299/86 |

*Primary Examiner*—Ernest R. Purser
*Attorney*—Melville, Strasser, Foster & Hoffman

[57] ABSTRACT

This invention resides in providing a resilient, ring-like member between a work tool and a work tool holder so as, in many cases, to permit relative motion, axial and/or rotative, between them. The work tool and work tool holder are intended for use primarily in connection with mining, excavating and earth working machines and the like. The work tool may comprise elongated elements having a shank portion with a working tip at one end and a gauge-determining abutment surface at at least the other end. The work tool holders may comprise bodies having a shank receiving perforation and means in association with the bottom of the perforation having an abutment adapted to cooperate with the abutment on the work tool. The ring-like member may be positioned in a groove on the work tool with a portion thereof adapted to abut some part of the work tool holder or it may be located in a groove in the work tool holder with a portion thereof adapted to engage a shallow depression or the like in the work tool. The resiliency and shape of the ring-like member permits the work tool to be forced into the work tool holder whereafter it will often be movable with respect thereto but captively held. The ring-like member may be formed of metal or plastic and may have a variety of shapes, for the most part, however, having a generally cylindrical, at least in part, configuration. The working portion of this resilient, generally cylindrical, ring-like retainer is capable of axial elongation whereby to present a knock-in, pry-out relationship between the work tool and work tool holder.

32 Claims, 17 Drawing Figures

Patented Oct. 23, 1973
3,767,266
3 Sheets-Sheet 1
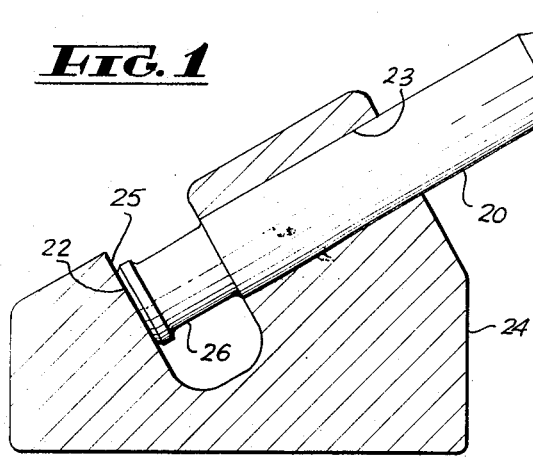
FIG. 1
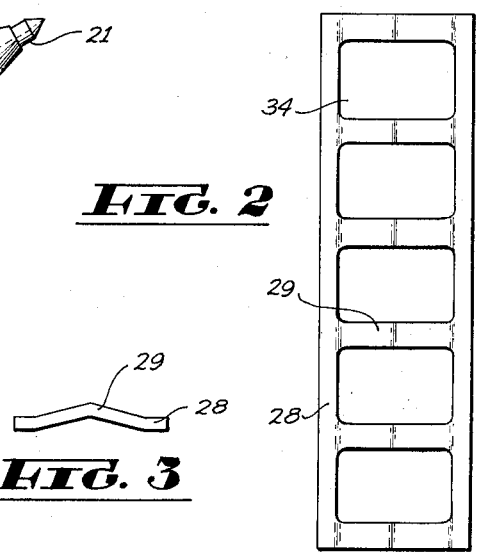
FIG. 2
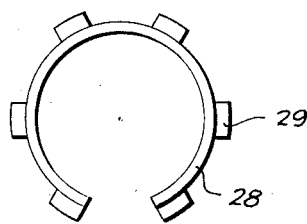
FIG. 3
FIG. 4
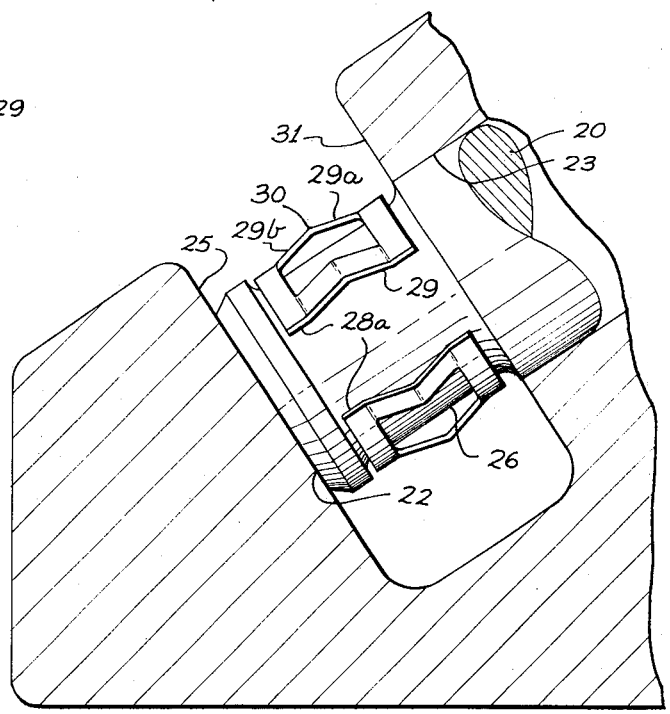
FIG. 6
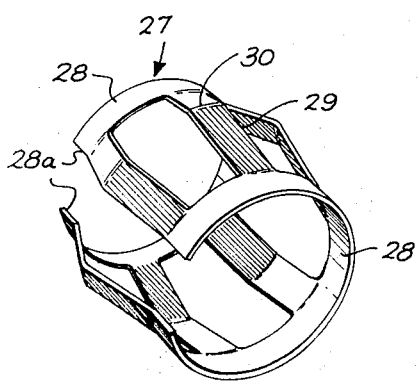
FIG. 5
INVENTOR/S
CLAUDE B. KREKELER,
BY *Melville, Strasser, Foster and Hoffman*
ATTORNEYS Patented Oct. 23, 1973

INVENTOR/S
CLAUDE B. KREKELER,

BY *Melville, Strasser, Foster and Hoffman*
ATTORNEYS

Patented Oct. 23, 1973

INVENTOR/S
CLAUDE B. KREKELER,

BY *Melville, Strasser, Foster and Hoffman*
ATTORNEYS

RESILIENT RETAINING MEANS FOR CONNECTING WORK TOOLS AND WORK TOOL HOLDERS

CROSS REFERENCE TO RELATED APPLICATION

This invention is closely related to a co-pending application of the same inventor, Ser. No. 70,340 filed Sept. 3, 1970 and entitled RESILIENT RETAINING MEANS FOR JOINING WORK TOOL AND WORK TOOL HOLDERS. Said co-pending application is a continuation-in-part of another co-pending application of the same inventor, Ser. No. 842,791, filed June 30, 1969 and entitled CUTTER BITS AND MEANS FOR MOUNTING THEM now U.S. Pat. No. 3,622,206, said application Ser. No. 842,791 is a continuation-in-part of the application of the same inventor, Ser. No. 753,398 filed Aug. 19, 1968 and entitled CUTTER BITS AND MEANS FOR MOUNTING THEM, now abandoned.

BACKGROUND OF THE INVENTION

1. Field of the Invention

The invention relates to mining, excavating and earth working machinery and the like, particularly to improved means for mounting work tools, such as cutter bits or digger teeth, in holders which are fixed to the machinery for presenting the bits or teeth in proper working position so that they may be driven against the face of the material to be mined, excavated or worked. The terms cutter bit and work tool are intended to encompass digger teeth, trenching teeth and the like; the terms work holder and mounting means are intended to encompass the various structures, such as lugs, socket members, bit holders and teeth holders, which receive the work tools to make them operable by and with the particular machinery involved. Most of these work tools, work tool holder arrangements are of the knock-in, pry-out type.

2. Description of the Prior Art

In the present specification most of the embodiments of the present invention will be described as applied to work tools and work tool holders therefor, particularly as applied to mining machines, excavating apparatus and earth working machinery and the like, including trenching machines, wheel type and chain type. It will be apparent to those skilled in the art, however, that uses other than holding various mining bits and trenching teeth in place may be made of the invention.

Cutter bits and holders to which the present invention may be applied are shown in U.S. Pat. Nos. 2,613,069; 2,950,096; 2,965,365; 3,057,609; 3,093,365; 3,114,537; 3,397,012 and 3,397,013 as well as in the co-pending applications referred to above. In some instances the cutter bit or work tool is rotatable within the holder, in others it is not. The foregoing patents show various resilient retaining means for releasably maintaining the work tool within the work tool holders. As the shank receiving perforation, however, becomes worn during use and the work tool shank is more loosely accommodated therein, the shank holding capabilities of such retaining means are diminished.

Although no search of the prior patent art has been conducted with respect to the improved resilient retainer for joining work tools and work tool holders according to the present invention, it is believed that the patents above noted are representative of the general state of the art. In addition, U.S. Pat. Nos. 3,498,677; 3,499,685 and 3,519,309 should be considered along with FIGS. 6 and 7 of U.S. Pat. No. 3,397,012, these latter four patents perhaps being the closest prior art.

SUMMARY OF THE INVENTION

The present invention relates particularly to improved resilient retaining means for securing the shanks of work tools, such as mine cutter bits, earth digging teeth and trenching teeth, in their respective work tool holders. For the most part, as indicated, these retaining means are resilient and will maintain the work tool shanks in their respective shank receiving perfortions by friction. The retaining means will elongate axially as the shank is forced into the perforation; such retaining means may also contract during this time. These retaining means will function efficiently in spite of wear on the shank receiving perforation, or even on the shank. Despite long use and wear of the work tool and work tool holder assembly, the work tool will be properly retained in its respective shank receiving perforation. In some arrangements the retaining means, while maintaining the work tool within the work tool holder, will permit short, axial reciprocating movement of the work tool within the work tool holder and this shuttling action prevents sticking and packing whereby to promote rotation in some instances and whereby to maintain the perforation clean.

BRIEF DESCRIPTION OF THE DRAWINGS

FIG. 1 is an elevational view, partly in cross section, illustrating a cutter bit-lug assembly to which the retaining means of the present invention may be applied.

FIG. 2 is a plan view illustrating one embodiment of the retaining means of the present invention prior to its last forming step.

FIG. 3 is an end view of the structure of FIG. 2.

FIG. 4 is an end view of the retaining means of FIGS. 2 and 3 in its final formed condition.

FIG. 5 is a perspective view of the retaining means of FIGS. 2–4.

FIG. 6 is a fragmentary elevational view, partly in cross section, illustrating the structure of FIG. 1 with the retaining means of FIGS. 2–5 in place.

FIG. 11 A is a fragmentary representation of a modification of the arrangements of FIGS. 10 and 11.

DESCRIPTION OF THE PREFERRED EMBODIMENTS

Figure 7:
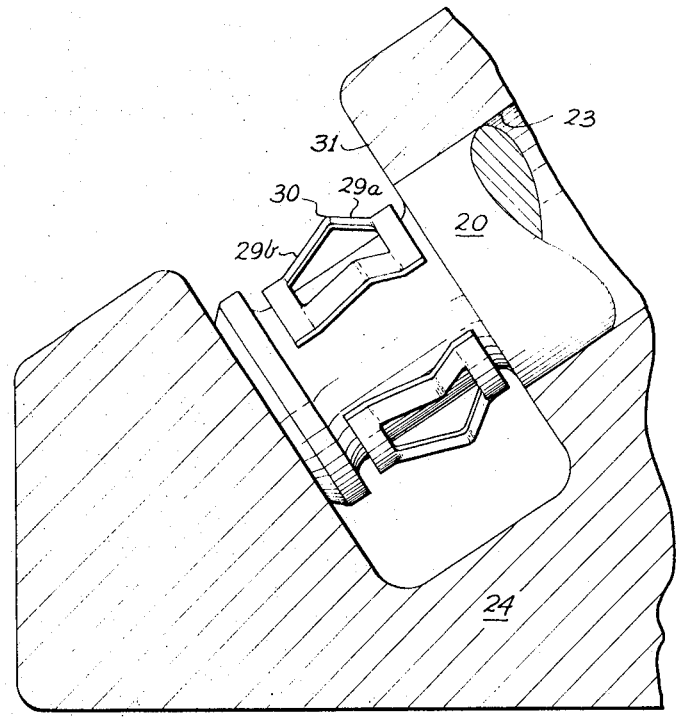
FIG. 7 is a view similar to FIG. 6 illustrating a modified form of retaining means of FIG. 6.
Figure 8:
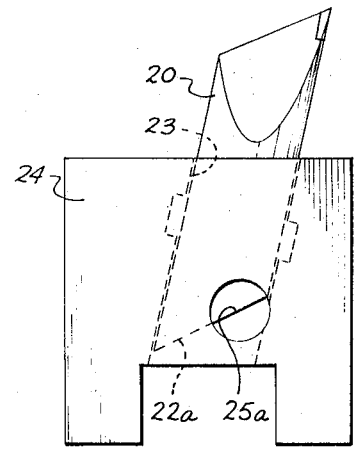
FIG. 8 is an elevational view of another exemplary cutter bit-lug assembly to which the retaining means of the present invention may be applied.
Figure 9:
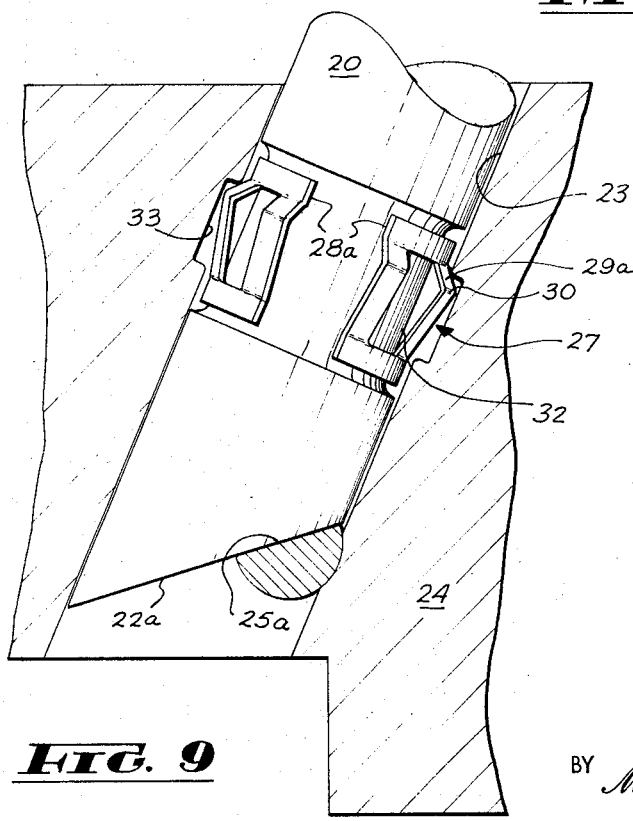
FIG. 9 is a fragmentary view of the structure of FIG. 8, partly in cross section, and illustrating the use of the retaining means of the present invention.
Figure 11A:
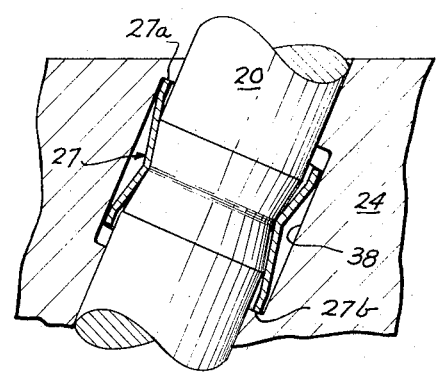
FIG. 11 is similar to FIG. 9 and illustrates the use of the retaining means of FIG. 10.
Figure 11:
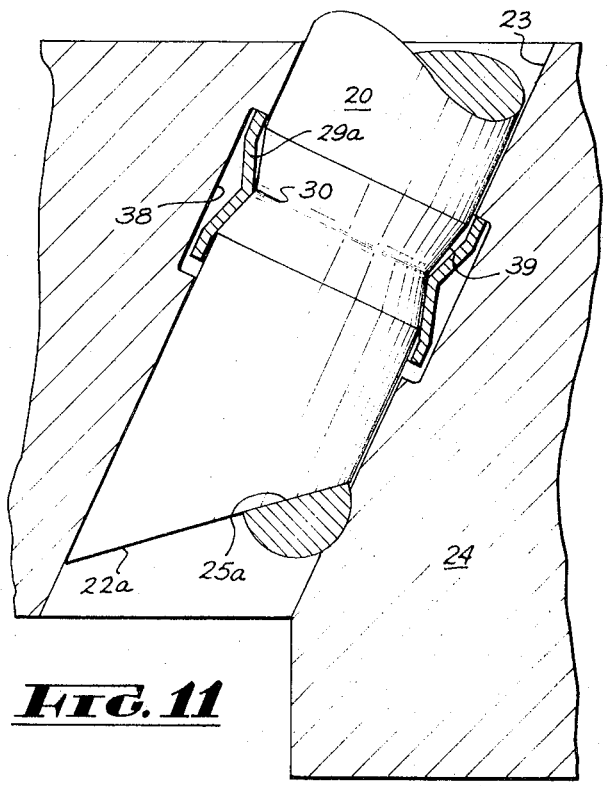

The work tool and work tool holder assembly generally illustrated in FIGS. 1, 6 and 7 is much like those shown and described in U.S. Pat. No. 3,397,012 while the work tool and work tool holder assembly generally illustrated in FIGS. 8, 9 and 11 is much like that shown in U.S. Pat. No. 3,622,206 in the name of the same inventor. As will now be described, various forms of the instant invention are particularly well suited for use with these assemblies although the invention is not restricted thereto except as set forth in the subjoined claims.

The cutter bit 20 of FIGS. 1, 6 and 7 has a cutting point 21 at one end and an abutment means 22 at the other end. The bit 20 is circular in cross section and is just nicely received within a perforation 23 in the work tool holder or lug 24. Associated with the lug 24 and is shank receiving perforation 23 is an abutment means 25 which cooperates with the abutment means 22 on the work tool or bit 20 whereby properly to position same. The abutment means 25 may or may not be an integral part of the lug 24. The shank of the bit 20 has a shallow groove 26 to receive the retainer of this invention and which retainer will maintain the bit 20 within the lug 24 in what will be seen to be a knock-in pry-out arrangement.

One form of the resilient retainer of this invention is illustrated in FIGS. 4, 5 and 6 and is generally indicated at 27. This form of the retainer may be formed from a strip of metal or the like cut out and shaped as indicated in FIGS. 2 and 3. The retainer 27 is generally cylindrical, having a somewhat barrel-shaped form, comprised of a pair of end rims 28 joined by parallel ribs 29 having a series of angularly disposed, outwardly protruding ridge-like portions 30 whereby to define retainer abutment surfaces 29a, see FIG. 6. The retainer 27 is not completely cylindrical in that the ends 28a of the rims do not meet. This retainer 27 is made of resilient material, preferably metal.

The ends 28a of the retainer 27 are forceably spread apart and the retainer then slipped onto the bit 20 in the region of the groove 26. The bit 20 having the retainer 27 thereon may then be knocked into the lug 24 until the bit abutment means 22 engages the lug abutment means 25. As the bit 20 is forced through the perforation 23, the retainer 27, the ridge-like elements 30 of which are normally disposed in a circle having a diameter greater than that of the perforation 23, may in effect be compressed in two directions due to the resilient nature of the retainer and the shape imparted to it in this form. The webs 29 will tend to flatten out thus causing the retainer 27 to elongate momentarily, and the ends 28a may move towards one another. As soon, however, as the retainer 27 clears the bottom 31 of the lug 24 defining the perforation 23, the retainer may spring back to the relaxed, work tool holding position indicated in FIGS. 5 and 6. In these Figures the ridge-like elements 30 are shown as being centrally located so that the web portions 29a and 29b are of equal lengths and slope. As indicated, the web portion 29a constitutes the retainer abutment surface. The bit 20, once inserted within the perforation 23 in the manner depicted in FIG. 6, is prevented from coming out of the lug 24 by reason of engagement of the retainer abutment surface 29a with the lug bottom 31. By use of a suitable tool, however, the bit 20 may be forced or pryed out of the perforation 23 at which time the webs 29 will again flatten out and the ends 28a will contract.

It should be observed that in this embodiment the work tool 20 is free to reciprocate axially within the lug perforation 23 by the amount of distance between engagement of the retainer abutment surface 29a and the lug bottom 31. This shuttling action of the bit 20 within the perforation 23 of the lug 24 prevents sticking and packing and, in the type of work tool, work tool holder arrangement shown in FIG. 6, promotes rotation of the bit within the lug, all of which helps to keep the perforation 23 clean. In the form of retainer shown in FIGS. 5 and 6, the openings or spaces between the webs 29 let dirt and fines escape, an important feature of this arrangement.

The amount of shuttling action of the work tool 20 within the work tool holder 24 may be controlled by the particular shape of the retainer 27, specifically the location of the ridge-like elements 30. This is illustrated in FIG. 7 wherein the elements 30 have been so located as to shorten the length of the web portions 29a. This brings these retainer abutment surfaces 29a closer to the lug bottom 31 thereby shortening the amount of possible axial movement of the bit 20 within the lug 24. The relatively more gentle slope of the web portion 29b in FIG. 7 will permit the bit 20 to be forced through the perforation 23 with less effort. By the same token, however, the relatively steeper slope of the retaining bearing surface 29a will make the bit 20 more difficult to remove from the lug 24 when it becomes time to replace this bit. Since it is desirable to be able to replace the bit 20 from time to time, care must be taken not to move the ridge-like elements of the web too far, in either direction, from the center thereof.

In FIGS. 8 and 9 the retainer of this invention has been illustrated as applied to a work tool and work tool holder such as shown in U.S. Pat. No. 3,622,206. In this type of arrangement, due to the cooperation of the work tool abutment means 22a and the lug abutment means 25a, the work tool 20 does not rotate within the work tool holder 24 and it is usually desirable to prevent longitudinal reciprocation as well. A knock-in, pry-out arrangement, however, is also desired here and the retainer of this invention may be utilized to achieve this. As shown in FIG. 9 the work tool 20 is provided with a relatively shallow groove 32 in which the retainer 27 is located. This particular retainer is shaped like that of FIG. 7 in that the ridge-like element 30 is located off center. The work tool holder 24 is provided with an internal, annular groove 33 into which the retainer abutment surfaces 29a and ridge-like elements 30 will spring when the bit 20 is knocked into position within the lug 24. As in the arrangement earlier described, the retainer 27 is not fully cylindrical in that there is a gap occasioned by the fact that the ends 28a do not meet. The bit 20 is retained in the perforation 23 of the lug 24 by reason of the retainer abutment surface 29a engaging the upper edge of the groove 33. In this arrangement there should be no play between such surface and edge. If desired, the retainer 27 may be given the shape of that shown in FIG. 6 rather than that shown in FIGS. 7 and 9.

Figure 14:
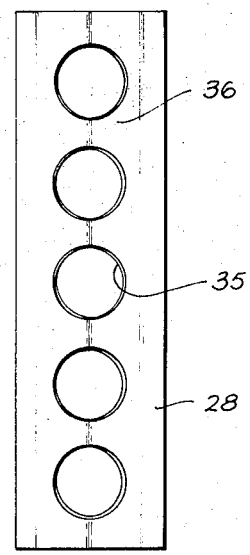
FIG. 14 is a plan view similar to FIG. 2, illustrating another embodiment of the retaining means of the present invention.
Figure 12:
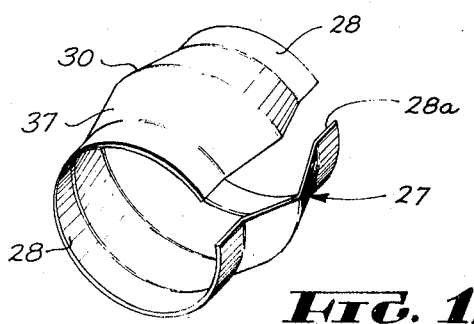
FIGS. 12 and 13 are perspective views of additional embodiments of the retaining means of the present invention.

FIGS. 2 and 3 illustrate the strip from which the retainer 27 of FIG. 5 is made. The webs 29 are shown as defining rectangular spaces 34. This, however, does not have to be the case and illustration of this fact is shown in FIG. 14. In this latter Figure the spaces 35 are circular, leaving "webs" 36. The point here is simply to illustrate that the webs 29 and 36 may take a variety of shapes depending on the kind of spaces 34 or 35 cut in the strip from which the retainer is formed. As a matter of fact, as illustrated in FIG. 12, the spaces 34 and 35 may in some instances be eliminated with the "web" thus being constituted by a solid or continuous formation 37. It is contemplated that this form of the invention will best be carried out when the material from which the retainer 27 is made is some form of stretchable plastic. The ends 28a do not meet, thus leaving a gap which permits the retainer to be compressed as the work tool 20 is forced into the perforation 23 of the work tool holder 24.

Figure 10:
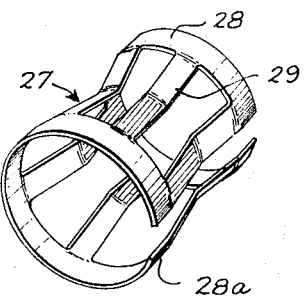
FIG. 10 is a perspective view of another embodiment of the retaining means of the present invention.
Figure 13:
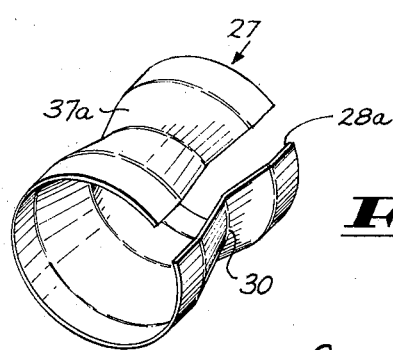

FIGS. 10 and 11 illustrate another form of the invention wherein the retainer 27, while still generally cylindrical, is not barrel shaped in the usual sense of the word. In this form of the invention the ridge-like elements 30 are turned inwardly rather than outwardly thus giving an hour glass shape to the retainer. As shown in FIG. 11 the retainer 27 is located in a groove 38 in the lug, there being a corresponding, shallow groove 39 in the bit. As the bit 20 is forced within perforation 23 of the lug 24, the web 29 will be collapsed, thus monentarily elongating the retainer, until such time as the groove 39 is brought into the position shown in FIG. 11 at which time the webs 29 will resume their normal position and the bit will be retained in the lug by reason of the web portion 29a of the retainer 27 abutting the area of the bit as defined by the groove 39. As generally illustrated in FIGS. 2 and 14, the webs and spaces may take a variety of forms ranging all the way to the solid web 37a illustrated in FIG. 13. It will be observed that the retainer 27 of FIG. 13 is, in effect, the inverse of that shown in FIG. 12 in that the ridge-like element 30 is turned inwardly rather than outwardly. The retainer 27 of FIG. 13 is also shown as having a gap therein as occasioned by the fact that the ends 28a do not meet.

Figure 15:
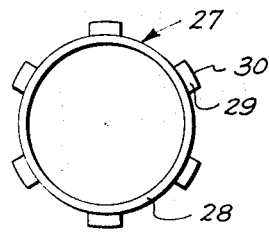
FIGS. 15 and 16 are end elevations of yet other embodiments of the retaining means of the present invention.
Figure 16:
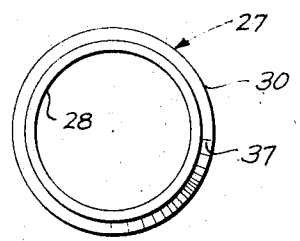

In some instances it may be desirable to have the retainer 27 be completely cylindrical and this is illustrated in FIGS. 15 and 16. The retainer 27 of FIG. 15 is like that generally illustrated in FIG. 5, but, in effect, with continuous ends 28. The retainer 27 of FIG. 16 is like that generally illustrated in FIG. 12 but again with continuous ends 28. If desired, the retainers of FIGS. 10 and 13 could be constructed in this continuous form also. These continuous forms of the retainer 27 are best utilized when the retainer is made from a stretchable plastic as distinguished from a spring-like metal.

Others variations are possible. The retainer illustrated in FIG. 11 could be modified by moving the ridge-like element 30 off center in either direction as discussed in connection with the retainer shown in FIGS. 7 and 9. The shape of the groove 39 on the bit 20 would be modified accordingly.

Another variation is shown in FIG. 11 A. Here the retainer 27 has a twist imparted to it, that is, it may be thought of as being formed on a helix, so that when it is positioned in the groove 38 an edge portion 27a will engage the upper wall of the groove 38 and an opposite edge portion 27b will engage the lower wall of the groove thus insuring that the retainer 27 is firmly engaged within the work tool holder. The width of the groove, however, will still permit the necessary monentary elongation of the retainer 27 as the work tool is forced in place and engagement of the retainer with the work tool will prevent reciprocation of the work tool with respect to the work tool holder as described in connection with FIGS. 9 and 11.

Although this invention has been described with respect to certain particular structures and arrangements, this has been for purposes of illustration only, and the invention is not to be limited to such specific structures and arrangements except in so far as they are positively set forth in the subjoined claims.

Modifications may be made in the invention without departing from the spirit of it.

Having thus described the invention, what is claimed as new and what is desired to be protected by Letters Patent is:

1. Retaining means for maintaining the shank of a bit and the like in the shank receiving perforation of a bit mounting means of mining and earth working machines, said retaining means comprising a resilient retainer, for removably connecting a bit and a mounting means, comprising a generally cylindrical member made of resilient material and capable of axial elongation, said member having a ridge-like abutment element thereon, whereby when said resilient retainer is located around a said bit shank within a said perforation the said ridge-like abutment element sets up a holding interference between said bit and said mounting means to prevent inadvertent removal of said bit from said perforation.

2. The retainer of claim 1 in which the retainer, shaped like an hour glass, is adapted to be received in a groove surrounding a perforation in a mounting means and said ridge-like abutment element is adapted to extend into a shallow groove provided in a bit positioned within said perforation.

3. The retainer of claim 2 in which said retainer comprises a pair of end members joined by a web, said ridge-like abutment element being located on said web.

4. The retainer of claim 3 in which said web is comprised of a plurality of members having spaces therebetween, there being a plurality of ridge-like abutment elements on said members, whereby dirt, debris, fines and the like may escape through said spaces.

5. The retainer of claim 3 in which the ends of each of said end members are spaced from one another, each of said end members being otherwise circular.

6. The retainer of claim 3 in which said end members are circular.

7. The retainer of claim 3 in which said web is continuous and said ridge-like abutment element is continuous.

8. The retainer of claim 7 in which each of said end members may be moved towards a closed condition whereby to reduce the diameter of said retainer and said web may be compressed whereby to elongate said retainer.

9. The structure claimed in claim 1 wherein said retainer is substantially barrel-shaped.

10. The retainer of claim 9 in which said retainer comprises a pair of end members joined by a web, said ridge-like abutment element being located on said web.

11. The retainer of claim 10 in which said web is comprised of a plurality of members having spaces therebetween, there being a plurality of said ridge-like abutment elements on said members, whereby dirt, debris, fines and the like may escape through said spaces.

12. The retainer of claim 10 in which said web is continuous and said ridge-like abutment element is continuous.

13. The retainer of claim 10 in which said end members are circular.

14. The retainer of claim 10 in which the ends of each of said end members are spaced from one another, each of said end members being otherwise circular.

15. The retainer of claim 14 in which each of said end members may be moved towards a closed condition whereby to reduce the diameter of said retainer and said web may be compressed whereby to elongate said member.

16. Retaining means for maintaining the shank of a bit and the like in the shank receiving perforation of a bit mounting means of mining and earth working machines, said retaining means comprising a resilient retainer, for removably connecting a bit and mounting means, comprising a generally cylindrical member made of resilient material and having a ridge-like abutment element thereon, said cylindrical member having a pair of end members, a web joining said end members, said ridge-like abutment element being located on said web, each of said end members defining the major part of an incomplete circle whereby there is a gap in said generally cylindrical member and whereby said generally cylindrical member may be squeezed to reduce the diameter thereof and whereby said web may be compressed to elongate said generally cylindrical member and whereby when said resilient retainer is located around a said bit shank within a said perforation the said ridge-like abutment element sets up a holding interference between said bit and said mounting means to prevent inadvertent removal of said bit from said perforation.

17. The retainer of claim 16 in which said web is one continuous member.

18. The retainer of claim 17 in which said generally cylindrical member is barrel shaped, said ridge-like abutment element being at the largest diameter of said generally cylindrical member.

19. The retainer of claim 17 in which said generally cylindrical member is hour glass shaped, said ridge-like abutment element being at the smallest diameter of said generally cylindrical member.

20. The retainer of claim 11 in which there are a plurality of webs having spaces therebetween, some at least of said webs having a said ridge-like abutment element thereon.

21. The retainer of claim 20 in which said generally cylindrical member is barrel shaped, said ridge-like abutment elements being disposed at the greatest diameter of said generally cylindrical member.

22. The retainer of claim 20 in which said generally cylindrical member is hour glass shaped, said ridge-like abutment elements being disposed at the least diameter of said generally cylindrical member.

23. In combination, a work tool having a gauge-determining abutment means thereon, a work tool holder having a perforation to just nicely receive said work tool, second abutment means cooperating with said gauge-determining abutment means to position said work tool in the said perforation of said work tool holder, and an axially elongatable resilient retainer to hold said work tool in said work tool holder, said retainer comprising a generally cylindrical ring-like member having a pair of circular end members, a web joining said end members, and a ridge-like abutment surface on said web, said end members and said web being made of resilient material, said retainer being located in a groove on one of said work tool and of said work tool holder and said ridge-like abutment surface engaging the other of said work tool and of said work tool holder to prevent said work tool from coming out of said perforation.

24. The combination of claim 23 in which said groove is located adjacent one end of said work tool outside of said perforation and said ridge-like abutment surface is adapted to engage said work tool holder in the region of an end of said perforation.

25. The combination of claim 23 in which said groove is located on said work tool away from the ends thereof, said work tool holder having a depression therein within the region of said perforation, said ridge-like abutment surface extending into said depression.

26. The combination of claim 23 in which said groove is located in said work tool holder, said work tool having a shallow depression thereon away from the ends thereof, and said ridge-like abutment surface extending into said shallow depression.

27. The combination of claim 23 in which each of said end members is parted whereby to provide a gap in said generally cylindrical ring-like member, said groove for said generally cylindrical ring-like member being on said work tool, the diameter of said ring-like member in the region of said ridge-like abutment surface being greater than the diameter of said perforation, whereby when said work tool is forced into said perforation said ring-like member may contract and said web may flatten to allow said work tool to be positioned within said perforation, said ridge-like abutment surface being in position to engage said work tool holder.

28. The combination of claim 27 in which there are a plurality of said webs defining spaces therebetween, at least some of said webs having a ridge-like abutment surface thereon, whereby dirt, debris, fines and the like may escape through said spaces.

29. The combination of claim 23 in which each of said end members is parted whereby to provide a gap in said generally cylindrical ring-like member, said groove for said generally cylindrical ring-like member being in said work tool holder, said work tool having a shallow depression thereon away from the ends thereof, the diameter of said ring-like member in the region of said ridge-like abutment surface being smaller than the diameter of said perforation, whereby when said work tool is forced into said perforation said ring-like member may contract and said web may flatten to allow said work tool to be positioned within said perforation, said ridge-like abutment surface extending into said shallow depression.

30. The combination of claim 29 in which there are a plurality of said webs defining spaces therebetween, at least some of said webs having a ridge-like abutment surface thereon, whereby dirt, debris, fines and the like may escape through said spaces.

31. Retaining means for maintaining the shank of a bit and the like in the shank receiving perforation of a bit mounting means of mining and earth working machines, said retaining means comprising a resilient retainer, for removably connecting a bit and mounting means, comprising a generally cylindrical ring-like member made of resilient material and being axially elongatable, said retainer comprising a pair of completely circular end members joined by a continuous web having a ridge-like abutment thereon, in its relaxed condition said retainer having a holding diameter, whereby in its elongated condition said retainer may be properly positioned and whereby when said resilient retainer is located around a said bit shank within a said perforation the said ridge-like abutment sets up a holding interference between said bit and said mounting means to prevent inadvertent removal of said bit from said perforation.

32. Retaining means for maintaining the shank of a bit and the like in the shank receiving perforation of a bit mounting means of mining and earth working machines, said retaining means comprising an axially elongatable resilient retainer, for holding a said bit in a said mounting means in a knock-in, pry-out relationship, said retainer comprising a generally cylindrical ring-like member having a pair of generally circular end members, a web joining said end members, and a ridge-like abutment surface on said web between said end members, said end members and said web being made of resilient material, whereby when said resilient retainer is located around a said bit shank within a said perforation the said ridge-like abutment surface sets up a holding interference between said bit and said mounting means to prevent inadvertent removal of said bit from said perforation.

* * * * *